United States Patent [19]
Yamazaki et al.

[11] Patent Number: 5,812,843
[45] Date of Patent: Sep. 22, 1998

[54] SYSTEM AND METHOD FOR EXECUTING JOB BETWEEN DIFFERENT OPERATING SYSTEMS

[75] Inventors: Shigemi Yamazaki; Kazunari Mukai; Yoshihiro Tajima; Kiyoshi Kohge; Takashi Komiyama, all of Nagoya, Japan

[73] Assignee: Fujitsu Limited, Kawasaki, Japan

[21] Appl. No.: 933,250

[22] Filed: Sep. 18, 1997

Related U.S. Application Data

[63] Continuation of Ser. No. 578,680, filed as PCT/JP95/01049 May 31, 1995 publixhed as WO95/33235 Dec. 7, 1995, abandoned.

[30] Foreign Application Priority Data

May 31, 1994 [JP] Japan ................................ 6-119306

[51] Int. Cl.⁶ ........................................... G06F 13/00
[52] U.S. Cl. ............... 395/670; 395/200.03; 395/200.05; 395/200.16
[58] Field of Search ............... 395/670, 200.03, 395/200.05, 200.16

[56] References Cited

U.S. PATENT DOCUMENTS

| | | | |
|---|---|---|---|
| 4,839,798 | 6/1989 | Eguchi et al. | 364/200 |
| 4,882,674 | 11/1989 | Quint et al. | 364/200 |
| 5,124,909 | 6/1992 | Blakely et al. | 395/200 |
| 5,218,699 | 6/1993 | Brandle et al. | 364/650 |
| 5,339,422 | 8/1994 | Brender et al. | 395/700 |
| 5,339,435 | 8/1994 | Lubkin et al. | 395/700 |
| 5,404,519 | 4/1995 | Denio | 395/650 |
| 5,430,876 | 7/1995 | Schreiber et al. | 395/650 |
| 5,457,797 | 10/1995 | Butterworth et al. | 395/650 |
| 5,471,615 | 11/1995 | Amatsu et al. | 395/200.03 |

FOREIGN PATENT DOCUMENTS

| | | |
|---|---|---|
| 3-316823 | 1/1989 | Japan . |
| 3-31935 | 2/1991 | Japan . |
| 3-265945 | 11/1991 | Japan . |

OTHER PUBLICATIONS

Ali et al, Controlled Job Migration in Load Balanced Distributed Systems, System Sciences, 1992 Annual Intl. Conf. pp. 585–592.

*Primary Examiner*—Lucien U. Toplu
*Attorney, Agent, or Firm*—Staas & Halsey

[57] ABSTRACT

In an information processing system running under two different operating systems (OS), a job entry unit enters a control program of a job, which is executed by the second operating system, via the first operating system. A language conversion/transfer unit converts the control program into a program for the second operating system, and transfers it to the second operating system. A data conversion/transfer unit mutually performs conversion and a transfer between files used for the first operating system and files used for the second operating system. A job execution unit executes the program for the second operating system using transferred data included in the files used for the second operating system. Thus, a user can execute the job without being conscious of differences between the operating systems.

12 Claims, 16 Drawing Sheets

| MSP | UXP |
|---|---|
| FIXED-LENGTH (F/FB)<br>1        72 73   80<br>\| SOURCE \| LINE No. \|<br>VARIABLE-LENGTH (V/VB)<br>1 2 3 4 5   12 13       L<br>\| L \| 00 \| LINE No. \| SOURCE \| | 1                 72<br>\| SOURCE \| QA \|<br>1               ≤243<br>\| SOURCE \| QA \| |

FIG. 4A

| MSP | UXP |
|---|---|
| FIXED-LENGTH (F/FB)<br>1               L<br>\| CHARACTER DATA \|<br>VARIABLE-LENGTH (V/VB)<br>1 2 3 4 5          L<br>\| L \| 00 \| CHARACTER DATA \|<br>UNSPECIFIED-LENGTH (U)<br>1              L<br>\| CHARACTER DATA \| | UNSPECIFIED-LENGTH<br>1<br>\| CHARACTER DATA \| QA \|<br>\|———$L_1$———\|1\|<br>*IN CASE OF FIXED-LENGTH/<br>UNSPECIFIED-LENGTH $L_1=L$<br>IN CASE OF VARIABLE-LENGTH $L_1=L-4$ |

FIG. 4B

| MSP | UXP |
|---|---|
| FIXED-LENGTH (F/FB)<br>1              L<br>\| BINARY DATA \|<br>VARIABLE-LENGTH (V/VB/VS/VBS)<br>1 2 3 4 5         L<br>\| L \| 00 \| BINARY DATA \|<br>UPSPECIFIED- (U)<br>1 LENGTH      L<br>\| BINARY DATA \| | 1<br>\| $L_1$ \| BINARY DATA \| $L_1$ \|<br>\|-4-\|———$L_1$———\|-4-\|<br>*IN CASE OF FIXED-LENGTH/<br>UNSPECIFIED-LENGTH $L_1=L$<br>IN CASE OF VARIABLE-LENGTH $L_1=L-4$ |

FIG. 4C

[FORT 1 STEP]

frtpx -W4."OPTIMIZE,OBJECT,VP,SOURCE" -Wx
    /user/mvpp/job/h6910JCLJ00001/@VPP_FORT_SRC_VOLSER/VPPFORT
        >/usr/mvpp/job/h6910JCLJ00001/JESF_J00001_S00001 2>&1 ¥0

[LKED 1 STEP]

frtpx-J-P-Dn-m-o/usr/mvpp/job/h6910JCLJ00001/@VPP_FORT_LOAD_volser/VPPFORT
    SYS933326_T085121_SV119_H6910JCL_LOADSET_volser
        >/user/mvpp/job/h6910JCLJ00001/JESF_J00001_S00002 2>&1 ¥0

[GO 1 STEP]

PATH=/usr/mvpp/job/h6910JCLJ00001/@VPP_FORT_LOAD_volser:$PATH;export PATH ¥0
fu20=/usr/mvppvfl/h6910JCLJ00001/outdata_VOLSER;EXPORT fu20 ¥0
VPPFORT < /usr/mvpp/job/h6910JCLJ00001/INDATA_volser
    >/usr/mvpp/job/h6910JCLJ00001/PIPEDATA_volser 2>&1 ¥0

[GO 2 STEP]

PATH=/usr/mvpp/job/h6910JCLJ00001/@VPP_FORT_LOAD_volser:$PATH;export PATH ¥0
fu20=/usr/mvppvfl/h6910JCLJ00001/OUTDATA2_volser;export fu20 ¥0
VPPFORT < /usr/mvpp/job/h6910JCLJ00001/PIPEDATA_volser
    > /usr/mvpp/job/h6910JCLJ00001/JESF_J00001_S00003 2>&1 ¥0

FIG. 7

```
fu10=/usr/mvppvfl/h6910CCCJOB00002/jesf_job00002_si0102_;
export fu10;
cd /usr/mvpp/job/h6910CCCJOB00002;
sh </usr/mvpp/job/h6910CCCJOB00002/jesf_job00002_si0101_>/usr/mvpp/job/h6910CCCJOB00002/jesf_job00002_so0103_2>&1
```

SYSTEM AND METHOD FOR EXECUTING JOB BETWEEN DIFFERENT OPERATING SYSTEMS

This application is a continuation of application Ser. No. 08/578,680, filed as PCT/JP95/01049 May 31, 1995 published as WO95/33235 Dec. 7, 1995, now abandoned.

TECHNICAL FIELD

The present invention relates to an inter-OS job execution system and a method where a system running under one OS (Operating System) requests another system running under a different OS to execute a partial job execution.

BACKGROUND ART

If a system running under, for example, the UNIX OS (Operating System) is newly developed, users who are familiar with another OS need to transfer resources using a control language JCL (Job Control Language), modify operations, and re-study the programming method used for the new operating system.

There may be problems in that the resources described in the familiar JCL cannot be used, or rewriting for transferring the resources is different and time-consuming work. Additionally, in most cases, there will be a very heavy work load burden for the users to re-study operation and use of the new operating system. Therefore, users of conventional operating systems hope that compatibility of operations between different operating systems can be guaranteed.

DISCLOSURE OF THE INVENTION

The object of the present invention is to provide an inter-OS job execution system and a method that allows users to request a different OS to execute a job, using a familiar language and without being conscious of the differences between the operating systems.

According to this invention, a user enters a job to a first processor, converts a program or data if necessary, and requests a second processor running under a different operating system to execute the job. The second processor processes this request, and returns the result to the first processor. Thus, the user utilizes the different operating system without being conscious of the differences between the operating systems, and the entire job can be executed as required.

FIG. 1 is a block diagram showing a principle of the inter-OS job execution system implemented by the present invention.

In FIG. 1, a front-end processor 1 corresponds to the first processor. If the job-executing program exists in, for example, one class, the front-end processor 1 executes a job. If the job-executing program exists in another class, the processor converts the program and data, and transfers them to a back-end processor 7 running under a different operating system, to request execution. After receiving the execution results, the first processor executes the processing. The front-end processor 1 consists of a job entry unit 2, a language conversion/transfer unit 3, a data conversion/transfer unit 4, and a job invocation unit 5.

The job entry unit 2 enters the first information in execute the program to the front-end processor 1. By performing this action, the job is entered in the front-end processor 1.

The language conversion/transfer unit 3 converts the entered first information into the second information for executing the program in the back-end processor 7, and transfers it to the back-end processor 7.

The data conversion/transfer unit 4 converts data handled by the front-end processor 1, and transfers the converted data to the back-end processor 7.

The job invocation unit 5 instructs the back-end processor 7 to execute a program specified by the second information using the transferred data.

The back-end processor 7 corresponds to the second processor, and includes a job execution unit 8. The job execution unit 8 executes the program specified by, the second information using the transferred data, and returns the execution results to the front-end processor 1, which transferred the data.

A storage unit 6 stores program and data files used by the front-end processor 1. A storage unit 9 stores program and data files used by the back-end processor 7.

As shown in FIG. 1, the job entry unit 2 enters the job to the front-end processor 1, and the language conversion/transfer unit 3 converts a control program for the entered job into a control program for the back-end processor 7, and transfers it to the back-end processor 7. In this case, the first information corresponds to the control program for the entered job, and the second information corresponds to the control program for the back-end processor 7. The data conversion/transfer unit 4 performs conversion and transfer between files for both the front-end processor 1 stored in the storage unit 6, and for the back-end processor 7 stored in the storage unit 9. Additionally, the job execution unit 8 executes the control program transferred by the language conversion/transfer unit 3 using the data transferred by the data conversion/transfer unit 4 from the front-end processor 1 to the back-end processor 7.

The job invocation unit 5 instructs the back-end processor 7 to execute the transferred control program using the transferred data.

As described above, when the user enters the job to the front-end processor 1, the front-end processor automatically performs program and data conversion as needed, and requests the back-end processor 7 running under a different OS to execute the job. The front-end processor 1 receives the execution results and completes the job by performing the entire processing. Accordingly, the user can use the different OS using a familiar job control language and without being conscious of the differences between the operating systems. A user who has knowledge of the job control language for the back-end processor may also enter a job to the back-end processor 7 via the front-end processor 1, which may be nearer to the user.

BRIEF DESCRIPTION OF THE DRAWINGS

FIG. 4A shows an example of converting a source data format according to the present invention;

FIG. 4B shows an example of converting a text data format according to the present invention;

FIG. 4C shows an example of converting a FORTRAN binary data format according to the present invention;

FIG. 7 shows an example of an executable shell script;

FIG. 15 shows another example of the executable shell script; and

BEST MODE OF CARRYING OUT THE INVENTION

A detailed explanation of a structure and methods according to a preferred embodiment of the present invention is hereafter provided reference to the drawings.

Figure 1:
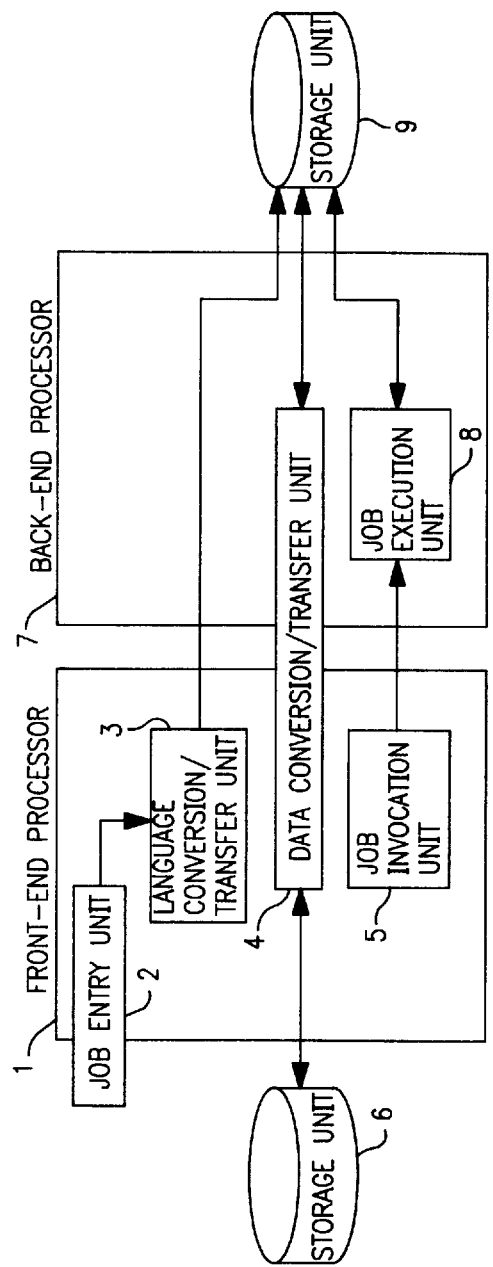
FIG. 1 is a block diagram showing a principle of the present invention.
Figure 2:
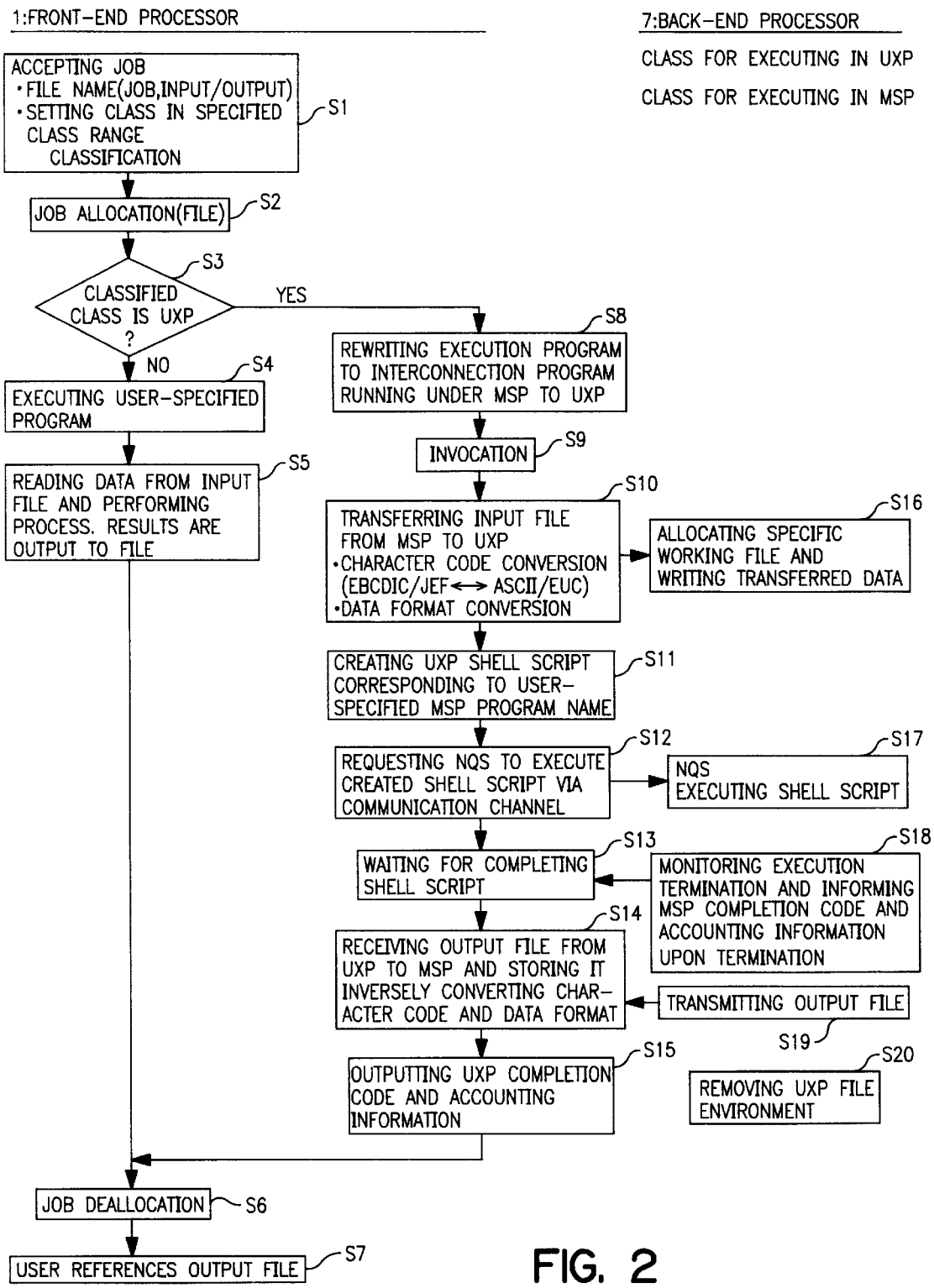
FIG. 2 is an operating flowchart showing operations of the present invention.

FIG. 2 is an operating flowchart for showing operations performed between different operating systems. In this figure, a front-end processor 1 and a back-end processor 7 correspond to the processors having the same numbers as shown in FIG. 1.

In Step S1 in FIG. 2, a job entry unit 2 accepts a job and retrieves information required for executing the job. This information includes a file name of the job, input/output file names accompanying with the file name of the job, and a class specification made in a specified class range.

The file name of the job indicates a name of a file that stores the job, and the input/output file names indicate the name of input file required for executing the job, and the name of output file required for storing the execution results of the job. There are classified two types of job class: one is a class for executing the job under UXP, which is the operating system running on the back-end processor 7, and the other is a class for executing the job under MSP, which is the operating system running on the front-end processor 1. When the job is accepted, a user specifies either of the two classes.

UXP is the name of the UNIX operating system, and MSP is the name of the operating system for the JCL. Since their designs are based on different concepts, there are differences such as file formats, character code sets, and job control languages, etc. between them.

In Step S2, the job entry unit 2 allocates a file for the job. Then, whether or not the allocated job class is either the UXP class or the MSP class is determined in Step S3.

If the job class is determined to be the UXP class (the result is YES in Step 3), the front-end processor 1 performs program and data conversion in Step S8 and the succeeding steps, and transfers the converted program and data to the back-end processor 7. Then, the front-end processor requests the back-end processor 7 to execute the job, and receives the execution results.

If the job class is determined to be the MSP class (the result is NO in Step S3), the job is required to be executed by the front-end processor 1. The front-end processor 1 executes a user-specified program in Step S4, processes it by reading data from the input file as needed, and outputs the results to the output file in Step S5. Then, the front-end processor 1 performs deallocation for the job in Step S6. In the meantime, the user references the output file in Step S7, and retrieves the desired execution results and instructs the front-end processor 1 to display and print them.

Next, detailed explanations of the activities when the front-end processor 1 requests the back-end processor 7 to execute a portion of a job required to be executed in the UXP class and receives the execution results, are provided below.

First of all, a language conversion/transfer unit 3 replaces a portion of the execution program required to be executed under the UXP with an interconnection program, running under the MSP in Step S8, and invokes the interconnection program in Step S9. Capabilities of a data conversion/transfer unit 4 and a job invocation unit 5 can be implemented by executing the interconnection program.

In Step S10, the interconnection program performs code conversion for character codes included in the input file and data format conversion, and transfers the converted data from the MSP to the UXP.

At that time, the character code of that data is converted from, for example, EBCDIC (Extended Binary Coded Decimal Interchange Code)/JEF code used by the MSP, into ASCII (American Standard Code for Information Interchange)/EUC code used by the UXP. Both the JEF and the EUC codes are the Japanese Kanji character codes. The format of that data is converted from the one used by the MSP into the one used by the UXP.

The back-end processor 7 receives the converted data transferred by the front-end processor 1, and allocates a specific working file to write the transferred data in Step S16. Thus, the data whose character codes and data format are converted, which is executable in the back-end processor 7, is written to the specific working file 7, and preparation for the job execution is complete.

The interconnection program creates a UXP shell script corresponding to a user-specified MSP program name in Step S11. Thus, the MSP program language is converted, and the shell script described in a language used by the UXP is created.

Next, the interconnection program transmits the created shell script to an NQS (Network Queuing System) included in the back-end processor 7 via a communications channel, and requests the NQS to execute it in Step S12. Then, in Step S13, the interconnection program waits for completion of the shell script execution and a return of the execution results.

The NQS included in the back-end processor 7 executes the requested shell script while referencing the specific working file in Step S17. Thus, the program (shell script) transferred from the front-end processor 1 is processed in the back-end processor 7 using the transferred data, and the execution results are obtained. The back-end processor 7 monitors termination of the execution, and informs the MSP of a completion code and accounting information, etc. upon termination of the execution in Step S18. The back-end processor then transmits the contents of the output file that stores the execution results in Step S19, and removes the file environment such as the specific working file and the output file, etc. running under the UXP.

The interconnection program receives the output file transmitted from the UXP in the MSP, and stores it as an execution result. At that time, the character codes and the data format are inversely converted so that they can be used for the MSP in Step S14. After the completion code has been informed from the UXP, the accounting information, etc. are output for a job logging, and the process goes to Step S6.

As described above, either the MSP or the front-end processor 1 executes the program retrieved from the file of the entered job name, if the job class is the MSP class. If the job class is the UXP class, the front-end processor performs the data conversion (character code conversion and data format conversion) and the program conversion, transmits the converted data and program to either the UXP or the back-end processor 7, and requests either of these two to execute them. Then the front-end processor 1 receives the execution results and executes the entire processing. The only thing the user needs to perform is to enter the job to the MSP. Therefore, this invention allows users to automatically use the UXP, which is a different operating system, while executing the process using a familiar job control language JCL.

Figure 3:
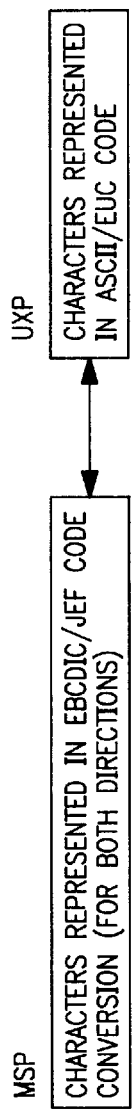
FIG. 3 shows an example of character code conversion according to the present invention.

FIG. 3 shows an example of character code conversion performed in Steps S10 and S14 in FIG. 2. When transmitting and receiving data between the MSP and the UXP via a communications channel, character code are converted as needed. Assume that the MSP uses characters represented in the EBCDIC/JEF code, and the UXP uses characters represented in the ASCII/EUC code. In this case, the front-end processor 1 converts the EBCDIC/JEF code into the ASCII/EUC code in the input file in Step S10. In Step S14, the ASCII/EUC code is inversely converted into the EBCDIC/JEF code in the output file. A system configuration where the back-end processor 7 performs either of the character code conversions, or both of them, can also be implemented.

FIGS. 4A, 4B, and 4C show examples of the data format conversion performed in Steps S10 and S14 in FIG. 2. Data handled by the MSP is described in a logical record format, while data handled by the UXP is described in bytes. Accordingly, the data format needs to be changed for transferring data.

FIG. 4A shows an example of converting source data formats. Fixed-length (F/FB) and variable-length (V/VB) formats of the source data are converted or inversely converted between the MSP and the UXP as shown in FIG. 4A. The FB indicates a fixed-length block, and the VB indicates a variable-length block. While an L indicates a length of a variable-length record, and a 0A indicates a line feed code.

FIG. 4B shows an example of converting text data formats. The text data formats such as a fixed-length (F/FB) format, a variable-length-(V/VB) format, and an unspecified-length (U) format, are converted or inversely converted between the MSP and the UXP as shown in FIG. 4B. Assuming that a length of the character data is $L_1$, $L_1$=L in the fixed-length format and the unspecified-length format, and $L_1$=L−4 in the variable-length format.

FIG. 4C shows an example of converting FORTRAN binary data formats (format orderless input/output data). The FORTRAN binary data formats such as a fixed-length (F/FB) format, a variable-length (V/VB/VS/VBS) format, and an unspecified-length (U) format, are converted or inversely converted between the MSP and the UXP as shown in FIG. 4C. The VS indicates a logical record including a plurality of physical records. Similar to the text data, a length of the binary data used by the UXP $L_1$ equals L in the fixed-length format and the unspecified-length format, and equals L−4 in the variable-length format.

Figure 5:
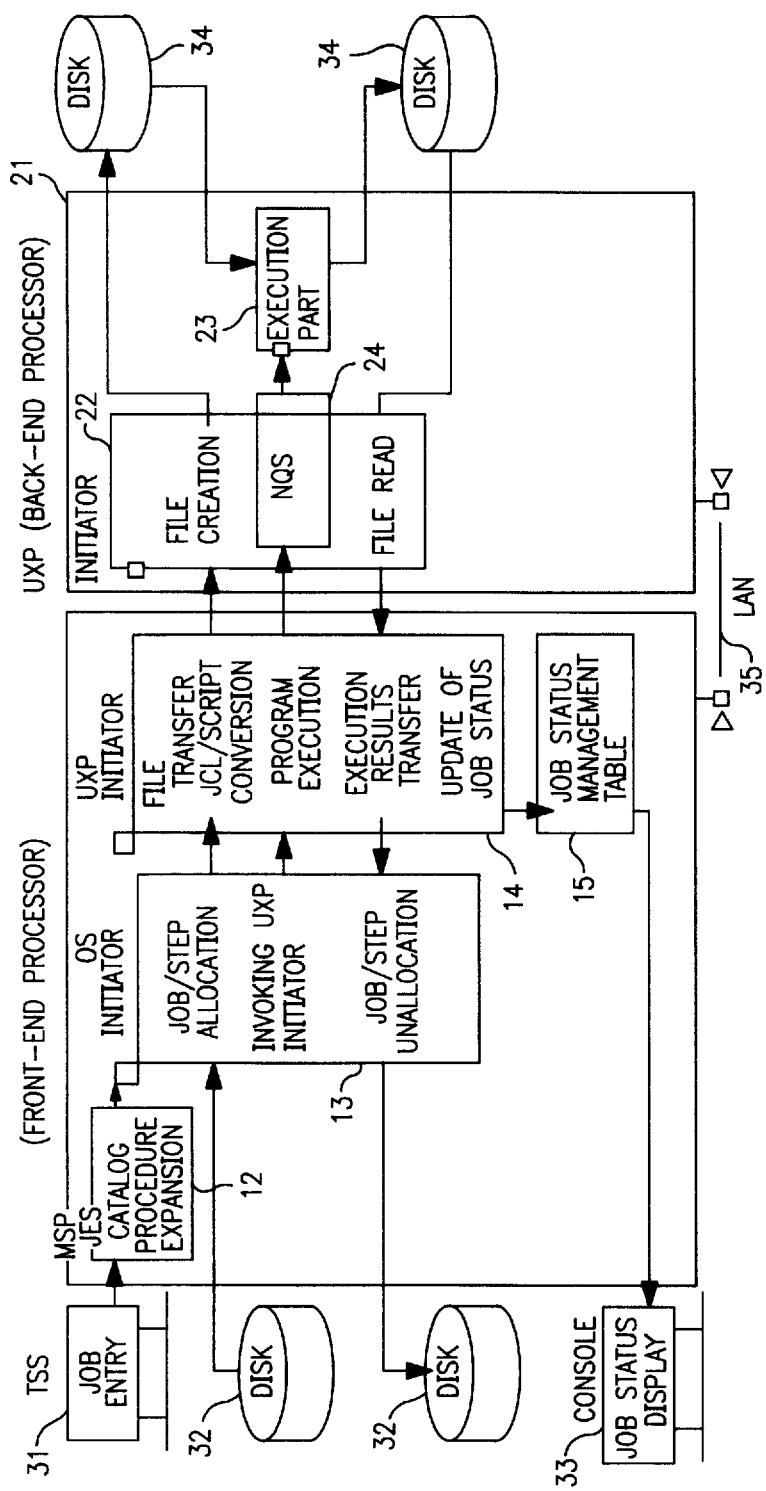
FIG. 5 shows a system configuration of an embodiment implemented by the present- invention.

FIG. 5 specifically shows a system configuration of the inter-OS job execution system shown in FIG. 1. The inter-OS job execution system shown in FIG. 5 consists of a front-end processor 11, a back-end processor 21, a TSS 31, disk units (DISK) 32 and 34, a console 33, and a LAN (Local Area Network) 35. The front-end processor 11 employs the MSP, and the back-end processor 21 employs the UXP. These processors are connected via the LAN 35, which is a communications network in a local area. The MSP and UXP may sometimes be called the front-end processor and the back-end processor, respectively.

In FIG. 5, the TSS 31 is a terminal used by a user to enter a job or retrieve execution results from an output file to be displayed on a screen. The console 33 is a device for displaying job status. The DISKs 32 and 34 correspond to the storage units 6 and 9 respectively, as shown in FIG. 1. They are used by the front-end processor 11 or the back-end processor 21 to write and read data.

A JES (Job Entry Subsystem) 12, an OS initiator 13, and a UXP initiator 14 are running under the MSP, and a job status management table 15 is updated.

The JES 12 retrieves the job entered via the TSS 31, performs a catalog procedure expansion, reflects the variables on JCL patterns, and passes the expanded job to the OS initiator 13.

The OS initiator 13 performs a job/step allocation to allocate a device for executing the job, and at the same time determines whether the job is to be executed in either a UXP class or an MSP class. If the job is determined to be executed in the MSP class, the MSP executes the job. If the job is determined to be executed in the UXP class, the OS initiator invokes the UXP initiator 14 to perform processes such as conversion, etc. so that the UXP can execute the job. Additionally, the OS initiator 13 receives a completion message from UXP initiator 14, and performs a job/step deallocation.

The UXP initiator 14 is invoked by the OS initiator 13. It performs data and program conversion, transfers the converted data and program to the back-end processor 21 via the LAN 35, and instructs the job invocation so that the UXP can execute the job. At that time, the UXP initiator 14 converts the program described in the JCL into a shell script described in an executable language for the UXP, by performing JCL/script conversion. Then, the UXP initiator 14 transfers the shell script to the NQS 24 included in the UXP to execute it. After the execution is terminated, the UXP initiator 14 receives a completion code and the execution results from the back-end processor 21, and converts the transferred results into data in a format suitable for the MSP, and stores them as an output file on the DISK 32. At that time, the UXP initiator 14 updates the job status included in the job status management table 15, and tells the console 33 to display a message indicating the job completion. In the meantime, after the user who has entered the job verifies the job completion, the user recognizes the execution results by making the TSS 31 display the contents of the output file stored on the DISK 32, or making a printer, not shown in this figure, print them, etc.

Meanwhile, in the back-end processor 21, an initiator 22, an NQS 24, and an execution part 23 are running under the UXP. The processor executes a process requested by the MSP, and returns the execution results to the front-end processor 11 that made the request.

The initiator 22 receives the converted data from the UXP initiator 14, creates a data file, and stores it on the DISK 34. The initiator 22 also retrieves the execution results from the DISK 34 to return them to the UXP initiator 14.

The NQS 24 appends the program (shell script) received from the UXP initiator 14 to a queue, and tells the execution part 23 to execute it.

The execution part 23 executes the process described in the program while referencing the data file stored on the DISK 34, and stores the execution results on the DISK 34.

Figure 6:
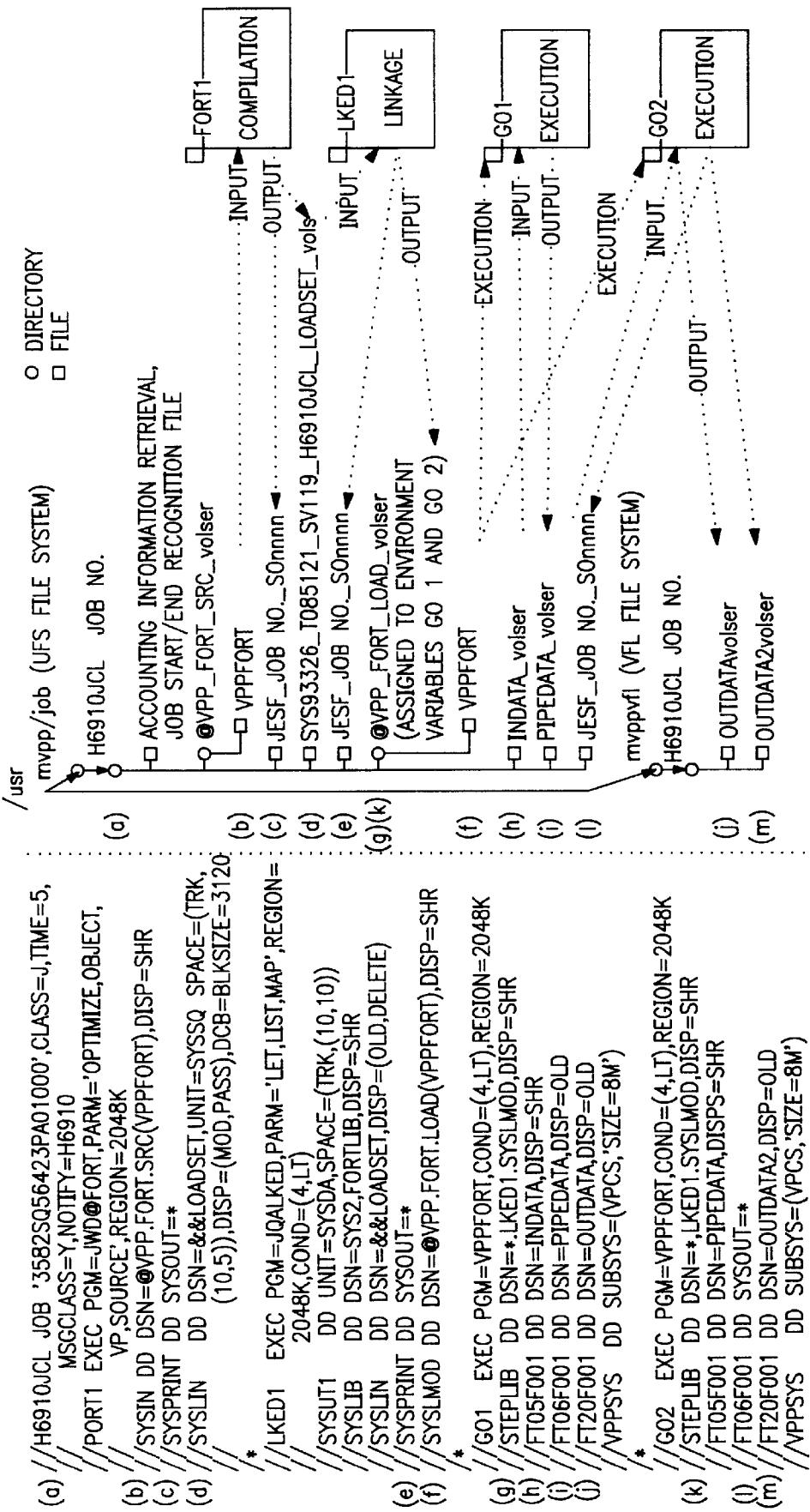
FIG. 6 shows an example of correspondence between an entered JCL program and a UXP file management structure.

Next, explanation on an embodiment of a program is hereafter provided referring to FIGS. 6 and 7. FIG. 6 shows an example of correspondence between an entered JCL program and a file management structure implemented with this invention. In this figure, the left-hand side indicates a control program described in the JCL, and the right-hand side indicates a UXP file environment where corresponding files are generated. (a) through (m) each indicate corresponding portions between the control program and the file environment.

In the control program described in the JCL, a description "H6910JCL" included in (a) is a job declaration. The class of the entire program described in the JCL is defined to be "J" as shown in (a). The class J indicates a job is required to be executed in the UXP class. That is, the program is intended to request the UXP to execute the job. Accordingly, after the language used in the program is converted as shown in FIG. 7, to be described later, the program is transferred to the UXP running under a different operating system. Class identifiers of both the UXP class and the MXP class defined by a user are not limited to the ones defined in this example. The user can define any identifier for both the MSP class and the UXP class. In response to the job declaration, a directory mvpp/job of a file system with a small capacity (UFS), and a directory mvppvfl of a file system with a large capacity (VFL), are created under a user directory /usr in the file environment. Job numbers of the directory H6910JCL corresponding to the entered job are also created under the respective directories. Then, the file environment required for executing the job is sequentially created under these directories.

The program shown in FIG. 6 consists of four job steps such as a FORT1, a LKED1, a GO1, and a G02. The FORT1 is a job step for compiling the FORTRAN program. The LKED1 is a job step for linking the compiled program. The job steps GO1 and G02 are intended to execute the linked program and perform data processing.

The FORT1 generates an input file (source file) VPP-FORT specified by a SYSIN DD statement in (b), an output file of error messages specified by a SYSPRINT DD statement in (c), and an output file of compilation results (object modules) specified by a SYSLIN DD statement in (d), in the UFS file system.

The LKED1 generates an output file of error messages specified by a SYSPRINT DD statement in (e), and an output file of linked results (load modules) specified by a SYSLMOD DD statement in (f), in the UFS file system.

The GO1 sets the load modules specified by a STEPL1B DD statement in (g) in an environment variable PATH of the GO1. Additionally, this job step generates input/output files each specified by an FT05F001 DD statement in (h), an FT06F001 DD statement in (i), and an FT20F001 DD statement in (j), in the UFS and VFL file systems.

The G02 sets the load modules specified by a STEPL1B DD statement in (k) in the environment variable PATH of the G02. This job step additionally generates output files each specified by an FT06F001 DD statement in (1) and an FT20F001 DD statement in (m), in the UFS and VFL file systems.

FIG. 7 shows an example of an executable shell script described in the JCL, implemented by the present invention. The shell script shown in FIG. 7 is obtained by converting the program described in the JCL shown in FIG. 6, into a program described in a language that can be executed by the UXP. The job steps FORT1, LKED1, GO1, and G02 shown in FIG. 7 each correspond to the job steps FORT1, LKED1, GO1, and G02 shown in the right-hand side in FIG. 6. In the FORT1 step, a description "frtpx" in the first line indicates a compilation command, the second line indicates a source file path, and the third line indicates an output file path. The job number herein is J00001. In the LKED1 step, a description "frtpx" in the first line indicates a linkage command, the second line indicates a volume set path for an input file, and the third line indicates an output file path. In the steps GO1 and GO2, "PATH" in the first line and "fu20" in the second line indicate environment variables for indicating where the data is output to. The third and fourth lines indicate paths for other input/output files. The executable shell script obtained by such conversion is transferred to the UXP and executed. After the execution results are returned to the MSP, the entire job execution is complete.

Figure 8:
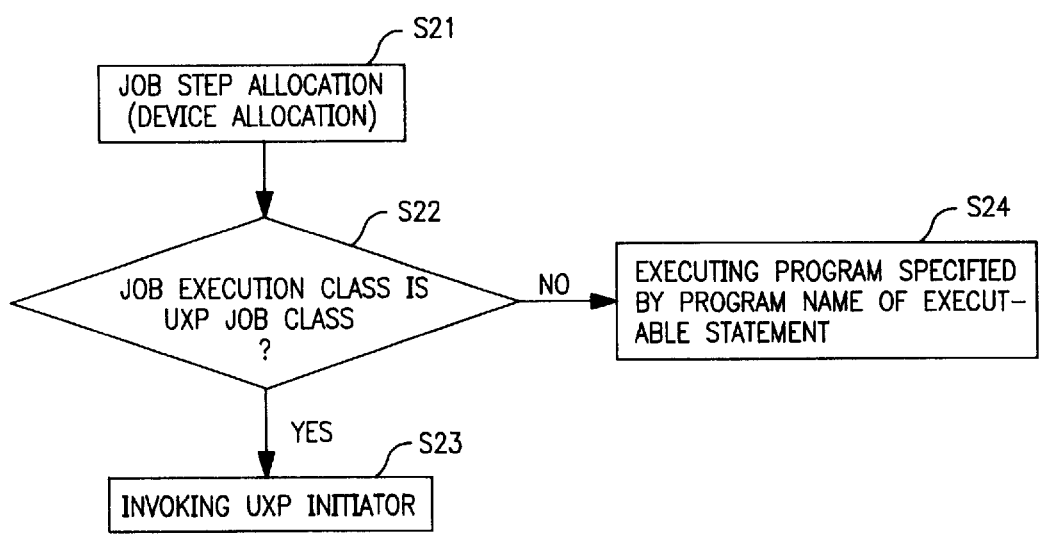
FIG. 8 shows an operating flowchart for invoking a UXP initiator by an OS initiator.

Next, detailed explanations on activities of the OS initiator 13 and the UXP initiator shown in FIG. 5 are provided below referring to FIG. 8 through FIG. 13. The OS initiator 13 invokes the UXP initiator 14 when a job class of a control program retrieved from an entered job file is determined to be a UXP class. The invoked UXP initiator 14 converts data and a language and transfers them to the UXP. The UXP executes a process according to the transferred data and program, and returns the execution results to the MSP. FIG. 8 shows a flowchart for invoking the UXP initiator 14 by the OS initiator 13 according to the present invention. In this figure, the OS initiator 13 performs a job step allocation, i.e. a device allocation in Step S21, and determines whether the execution class of the job is either a UXP class or an MSP job class in Step S22. Assuming a control program of the entered job is the one shown in FIG. 6, the job class is determined to be the UXP class (class=J) as shown in (a). If the determination result is YES in this step, i.e. the job execution class is the UXP class, a request for the job execution is made to the UXP. Accordingly, the OS initiator 13 invokes the UXP initiator 14 to convert and transfer the data and, the program in Step S23. If the result is NO, the job is executed by the MSP itself. That is, the program specified by a program name in the EXEC statement (executable statement) included in the job control program in Step S24 is executed, and the execution results are obtained.

As described above, if a class for executing a job in the MSP is described in a program retrieved from the corresponding file of the job entered by the user, the program is executed within the MSP itself. If the execution class is a UXP class, the OS initiator 13 invokes the UXP initiator 14 to convert the data and execute the program within the MSP.

Figure 9:
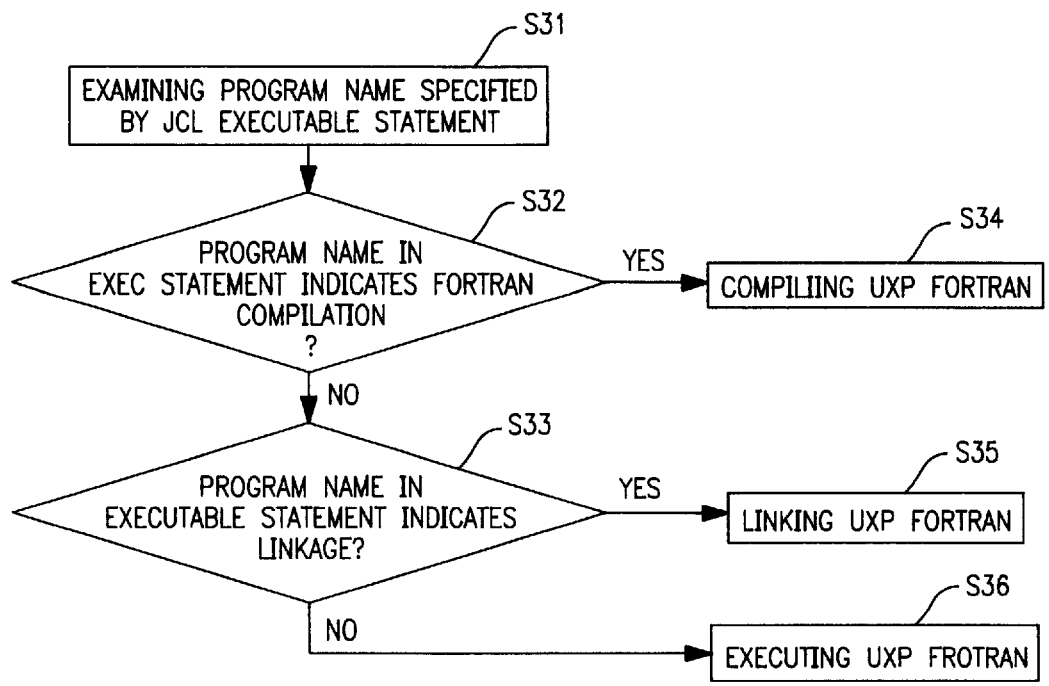
FIG. 9 shows an operating flowchart for a process performed by the UXP initiator.

FIG. 9 is a flowchart showing a process performed by the UXP initiator 14 invoked in Step S23 in FIG. 8.

In this figure, the UXP initiator 14 examines a program name specified in an EXEC statement included in a control program described in the JCL in Step S31. It determines whether or not the program name in the EXEC statement indicates compilation of a FORTRAN program in Step S32. If the result is YES, the UXP initiator 14 compiles the UXP FORTRAN program in Step S34. If the result is NO, whether or not the program name of the EXEC statement indicates linkage is determined in Step S33. If the result is YES, the UXP FORTRAN program is linked in Step S35. Otherwise, the UXP FORTRAN program is executed in Step S36.

For example, the statements such as the EXEC statement in the FORT1, the EXE statement in the LKED1, the EXEC statement in the G01, and the EXEC statement in the G02, include program names corresponding to compilation, linkage, execution, and execution.

Figure 10:
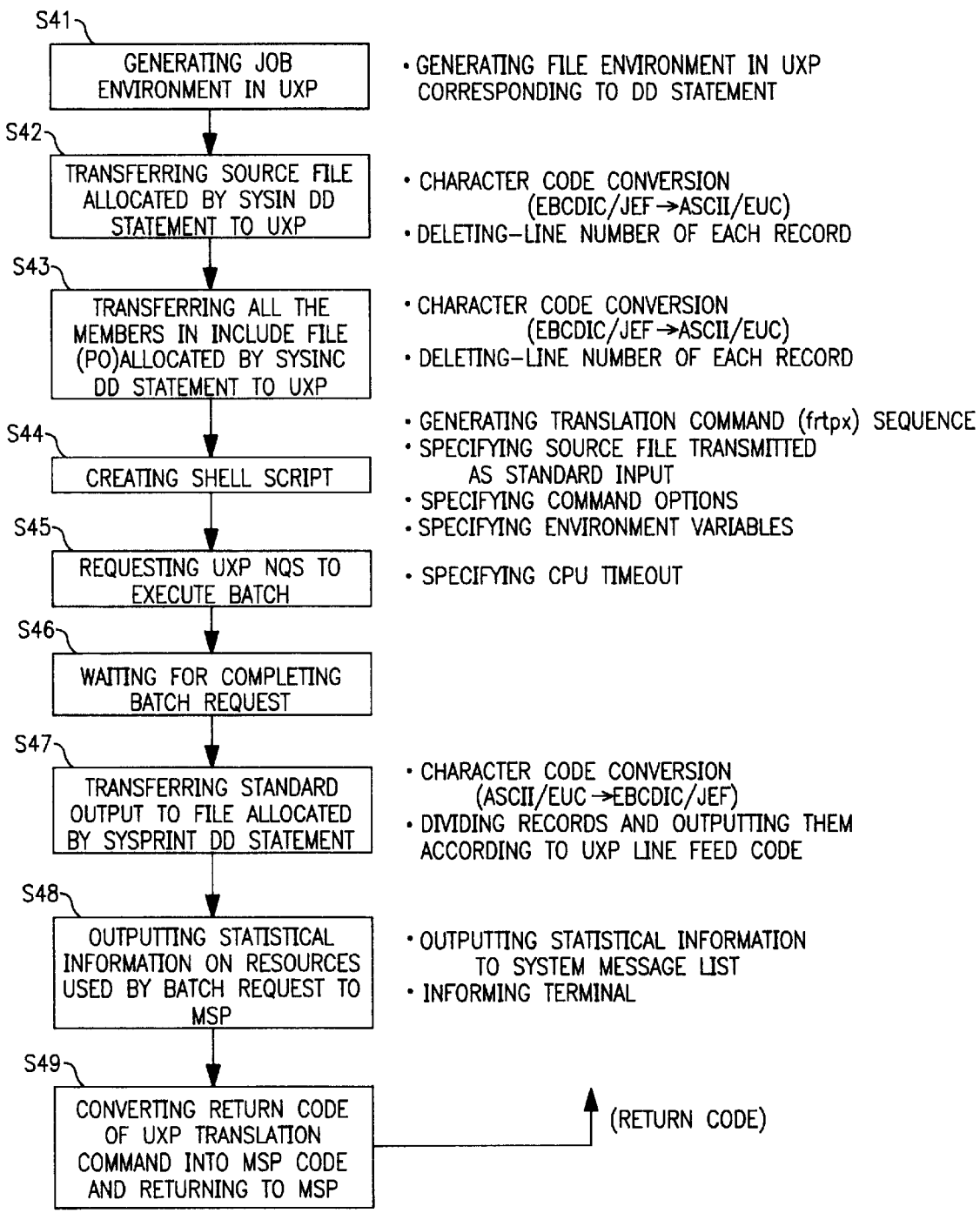
FIG. 10 shows an operating flowchart for translating a FORTRAN program by the UXP initiator.

Thus, it is determined which of the compilation, linkage, and execution is performed by the UXP initiator 14 shown in FIG. 5. FIG. 10 shows an operating flowchart of a FORTRAN program compilation performed by the UXP initiator 14. This figure is a detailed operating flowchart for the process performed in Step S34 in FIG. 9.

In FIG. 10, the UXP initiator 14 sets a job environment in the UXP in Step S41. File environment corresponding to each DD statement included in the control program is generated in the UXP.

Next, the UXP initiator 14 transfers the source file allocated by the SYSIN DD statement to the UXP in Step 42. Since character code conversion as shown in FIG. 3, for example, is performed at that time, the EBCDIC/JEF code is converted into the ASCII/EUC code. Besides, the initiator converts data format, and deletes the line numbers of each record. If an include file (PO) allocated by the SYSINC DD statement exists, all of the members are transferred to the UXP in Step S43. At that time, character code conversion similar to the one performed in Step S42 is performed, and the line numbers of each record are deleted.

Next, the UXP initiator 14 creates a shell script in Step S44. A sequence of the compilation command (frtpx) is created, and a source file transmitted as a standard input is specified. Command-options and environment variables are specified as needed. By performing this process, the UXP initiator 14 creates the FORT1 Step of the shell script shown in FIG. 7 using, for example, the control program shown in FIG. 6.

Next, the UXP initiator 14 transfers the shell script to an NQS 24 in the UXP, requests the NQS to execute a batch processing with a CPU timeout specified in Step S45, and waits for completion of the batch request in Step S46.

When receiving a completion code and execution results of the batch request from the UXP initiator 22, a standard output is transferred to a file allocated by the SYSPRINT DD statement in Step S47. At that time, the UXP initiator 14 inversely converts the character code, for example, as shown in FIG. 3. That is, the ASCII/EUC code is converted into the EBCDIC/JEF code to restore into the original character code. Additionally, the UXP initiator 14 inversely converts the data format to divide and output the record according to the line feed codes of the UXP.

Next, statistical information on the resources used by the batch request is output to the MSP in Step S48. This information includes collected data such as a time for using a CPU, accounting information, and other collected data. The statistical information is output to a system message list and informed to each user terminal.

Then, a return code of the UXP compilation command is converted into that of the MSP to return to the MSP in Step S49.

As described above, the UXP initiator 14 invoked within the MSP performs data conversion (character code conversion and data format conversion), and program conversion (such as conversion from the JCL program into a shell script), requests the UXP to execute a batch processing of compilation after transferring the converted data and program to the UXP via a LAN 35, receives the execution results and the statistical information, and outputs to a file. A user references, displays, and prints the execution results of the job included in the output file.

Figure 11:
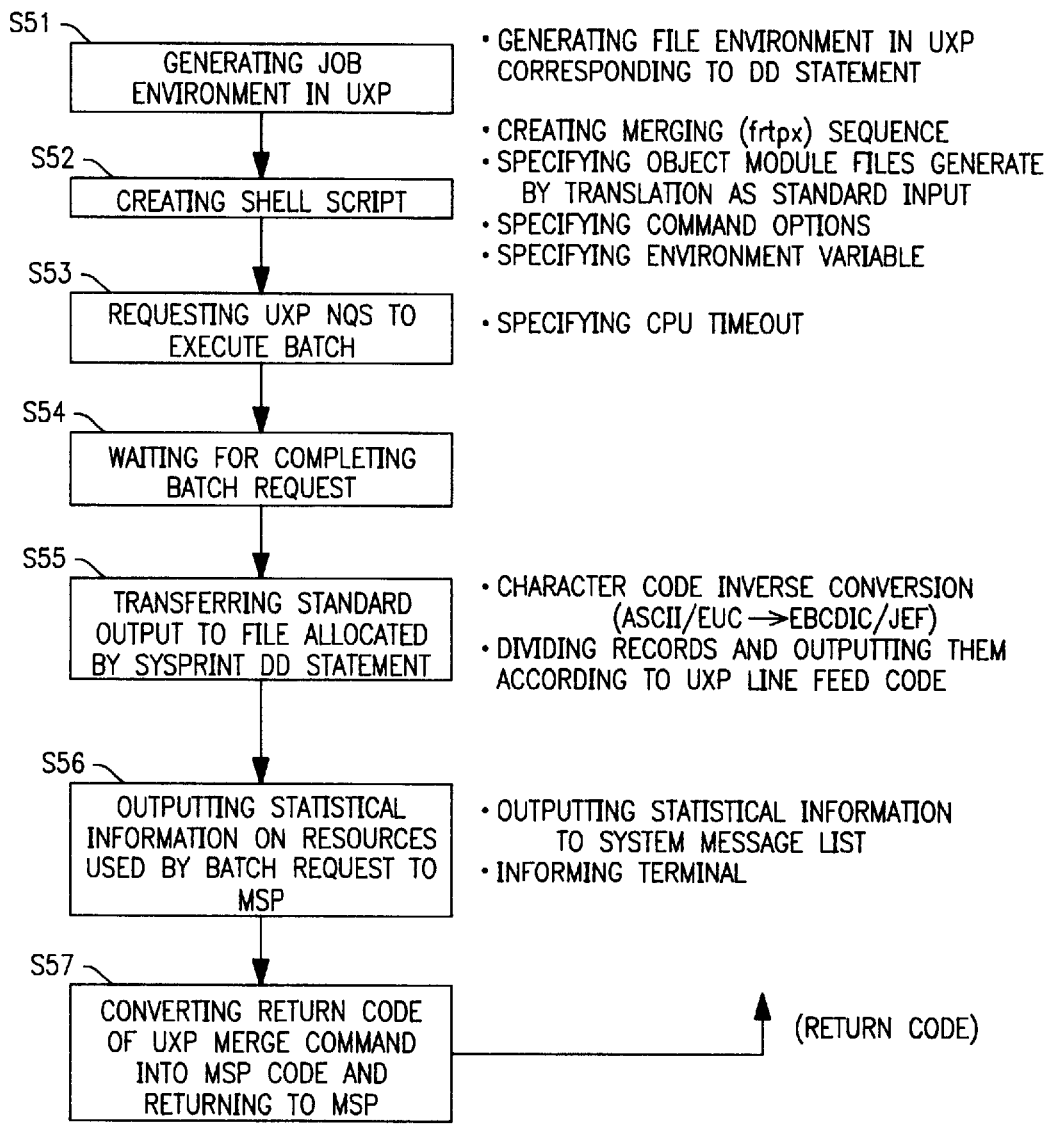
FIG. 11 shows an operating flowchart for merging the FORTRAN program by the UXP initiator.

FIG. 11 shows a operating flowchart for linking FORTRAN programs by the UXP initiator 14. This figure is a detailed operating flowchart of a process performed in Step S35 in FIG. 9.

In this figure, the UXP initiator 14 sets a job environment in the UXP in Step S51. File environment corresponding to each DD statement in the control program is generated in the UXP.

Next, the UXP initiator 14 creates a shell script in Step S52. That is, the UXP initiator 14 creates a sequence of the linkage command (frtpx) to specify object module files resulting from the compilation as standard inputs. The UXP initiator 14 also specifies command options and environment variables as needed. By performing this process, the LKED1 step of the shell script shown in FIG. 7 is created from the control program shown in FIG. 6.

The UXP initiator 14 transfers the shell script to the NQS 24 in the UXP, requests the batch execution with a CPU timeout specified in Step S53, and waits for completion of the batch request in Step S54.

When receiving a completion code of the batch request and execution results from the UXP initiator 22, the UXP initiator 14 transfers the standard output to a file allocated by the SYSPRINT DD statement in Step S55. At that time, the UXP initiator 14 inversely converts the character code shown in FIG. 3 to restore the ASCII/EUC code to the EBCDIC/JEF code, i.e. the original character code. Additionally, the initiator 14 inversely converts the data format to divides and outputs the record according to the line feed codes of the UXP.

Next, the UXP initiator 14 outputs the statistical information on the resources used by the batch request to the MSP in Step S56. The statistical information is output to a system message list and informed to each user terminal.

Then, the UXP initiator 14 converts a return code of the UXP linkage command into that of the MSP to for return to the MSP in Step S57.

As described above, the UXP initiator 14 invoked within the MSP performs program conversion (such as conversion from a JCL program into a shell script), requests batch execution for linkage after transferring the converted program to the UXP via a LAN 35, receives the execution results and statistical information, and outputs them to a file. The user references, displays, and prints the execution results of the job included in the output file.

Figure 12:
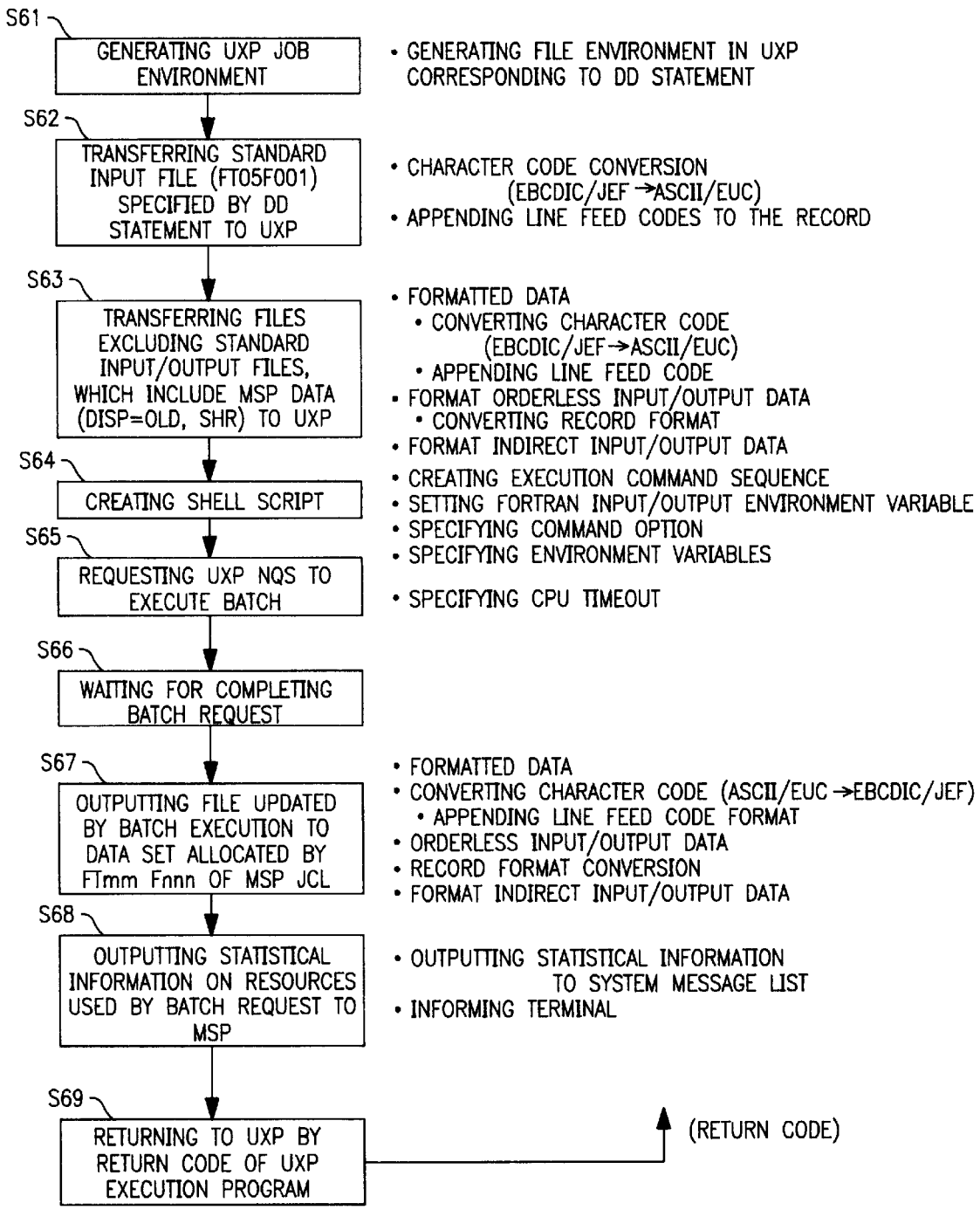
FIG. 12 shows a operating flowchart for executing the FORTRAN program by the UXP initiator.

FIG. 12 is a operating flowchart showing an execution process of FORTRAN data performed by the UXP initiator 14. This is a detailed flowchart of a process performed in Step S36 in FIG. 9.

In this figure, the UXP initiator 14 sets a job environment in the UXP in Step S61. That is, a file environment corresponding to each DD statement included in the control program is generated in the UXP.

Then, the UXP initiator 14 transfers a standard input file (FT05F001) specified by the SYSIN statement to the UXP in Step S62. At that time, the UXP initiator 14 performs character conversion, for example, as shown in FIG. 3 so that the EBCDIC/JEF code can be converted into the ASCII/EUC code. The UXP initiator 14 also performs data format conversion to append line feed codes to the record.

Next, the UXP initiator 14 transfers files excluding standard input/output files, which include MSP data (DISP= OLD, SHR), to the UXP in Step S63. At that time, the UXP initiator 14 performs character code conversion to append line feed codes for formatted data. For format-orderless input/output data, record format conversion similar to the one shown in FIG. 4C is performed. Additionally, format-indirect input/output data is transferred.

Then, the UXP initiator 14 creates a shell script in Step S64. That is, the UXP initiator 14 creates an execution command sequence to set FORTRAN input/output environment variables. The UXP initiator 14 also specifies command options and other environment variables as needed. There are other environment variables such as a LANGUAGE, for specifying an output language such as English, Japanese, etc. By performing this process, the steps GO1 and GO2 shown in FIG. 7 are created from the job control program shown in FIG. 6.

The UXP initiator 14 then transfers the shell script to the NQS24 of the UXP, requests the batch execution with a CPU timeout specified in Step S65, and waits for completion of the batch request in Step S66.

When receiving a completion code and the execution results from the initiator 22 in UXP, the UXP initiator 14 outputs a file updated by the batch execution to an MSP data set allocated by an FTmmFnnn in an MSP control program in Step S67. The FTmm indicates a device number for specifying FORTRAN input/output files, and the Fnnn indicates a generation number for the input/output files. For example, FT05F001 indicates a file of the device number 05 of the first generation. In this case, the character code is inversely converted to append line feed codes to the formatted data. While for the format-orderless input/output data, the record format is inversely converted in the same manner as in FIG. 4C. Additionally format-indirect input/output data is output.

Next, the UXP initiator 14 outputs statistical information on the resources used by the batch request to the MSP in Step S68. This information includes a time for using a CPU, used space of a memory, the number of reads/writes etc. The statistical information is output to a system message list and informed to each user terminal.

Then the system returns to the UXP by a return code of the UXP execution command in Step S69.

As described above, the UXP initiator 14 invoked within the MSP performs data conversion (character code conversion and data format conversion) and program conversion (such as conversion from a JCL program into a shell script), transfers them to the UXP via a LAN 35 to request batch execution, receives the execution results and statistical information, and outputs them to a output file. A user references, displays, prints, etc. the execution results of the job included in the output file.

Figure 13:
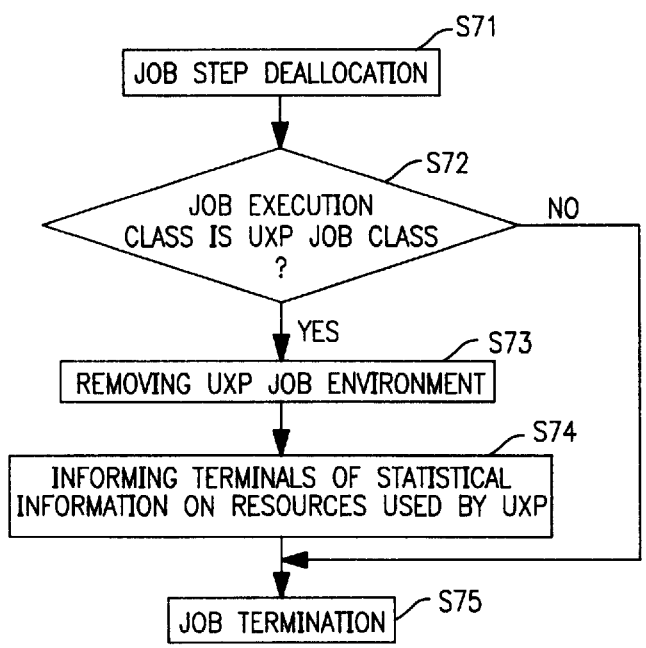
FIG. 13 shows a operating flowchart for terminating a UXP job by the OS initiator.

FIG. 13 is a operating flowchart showing termination process of the UXP job performed by the OS initiator 13. The OS initiator 13 performs the termination process shown in FIG. 13 when control is returned to the OS initiator by a return code after the UXP initiator 14 completes one of the processes performed in FIGS. 10 to 12.

In FIG. 13, the OS initiator 13 performs deal location of the job steps in Step S71, and determines whether or not an execution class of the job is a UXP job class in Step S72. If the result is YES, the OS initiator 13 releases a space for the UXP job environment in Step S73, informs each user terminal of the entire statistical information of the resources used by the UXP in Step S74, and terminates the job in Step S75. While if the result is NO at step S72, the OS initiator 13 immediately terminates the job in Step S75. After that, the user references the execution results of the job.

As described above, an embodiment of the present invention that automatically requests a different OS to perform compilation, linkage, and execution of a FORTRAN program described in the JCL is provided. According to the inter-OS job execution system implemented with the present invention, it is also possible to prepare a UXP program to be executed via the MSP.

Figure 14:
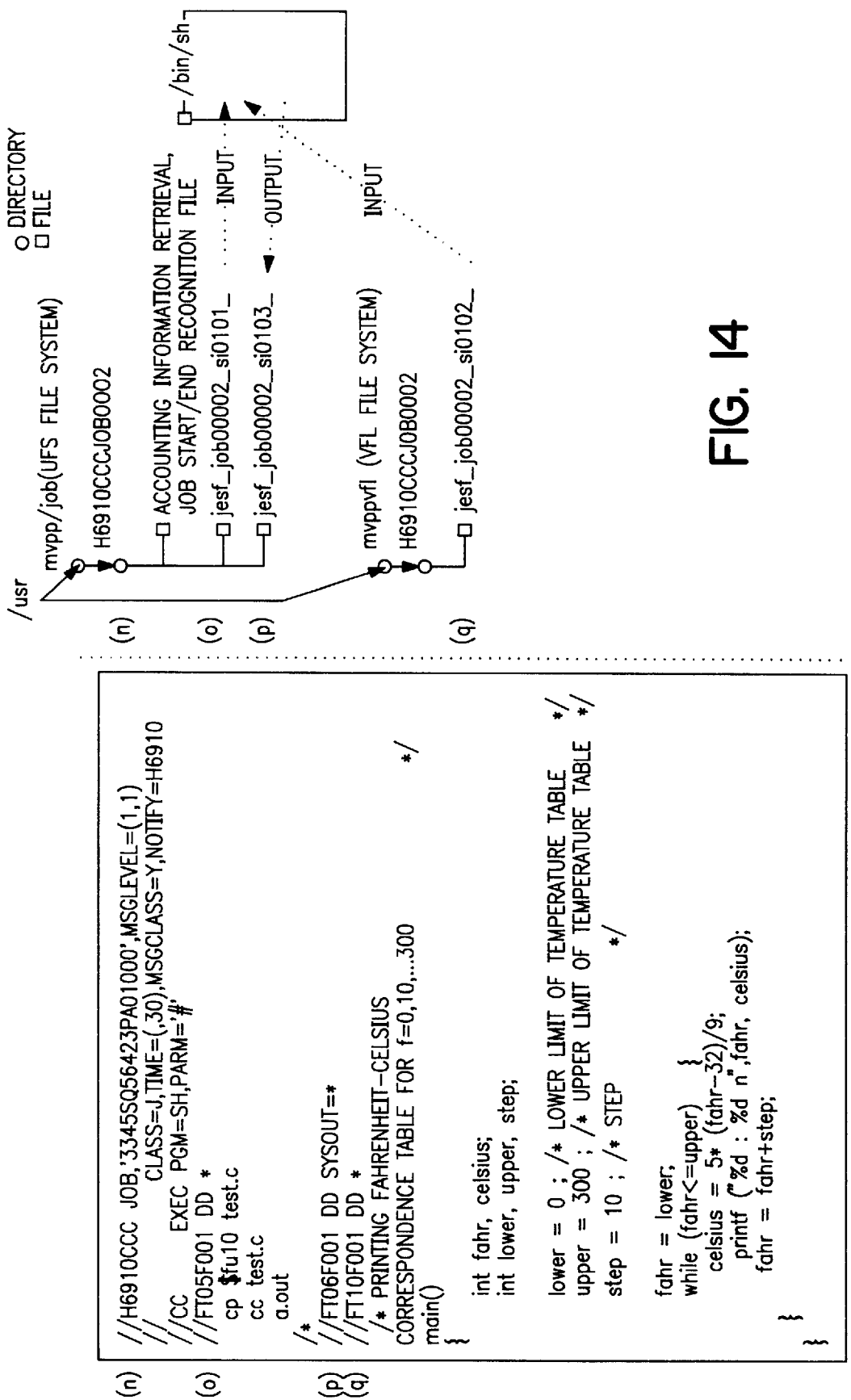
FIG. 14 shows another example of correspondence between the entered JCL program and the UXP file management structure.

FIG. 14 shows an example of correspondence between an entered JCL job including USR program descriptions and a UXP file management structure. In this figure, the left-hand side indicates a control program described in the JCL, and the right-hand side indicates a generated UXP file environment corresponding to the control program. (n), (o), (p), and (q) indicate correspondence between the control program and the file environment. The JCL control program includes descriptions that make the UXP compile and execute a program described in the C language written for printing (outputting) a Fahrenheit-Celsius correspondence temperature table. The control program includes an additional instruction that makes the UXP receive the execution results and output them to the MSP.

The JCL control program describes that H6910CCC in (n) is a job declaration and its job class is J. Accordingly, this job is required to be executed in a UXP job class. In response to the job declaration, a directory mvpp/job of the UFS file system, and a directory mvppvfl of the VFL file system, are generated under the user directory /usr in the file environment. An additional directory corresponding to the entered job H6910CCCJOB0002 is generated under each of these directories. Then, the file environment required for executing the job is sequentially generated.

The control program shown in FIG. 14 includes three FTmmFnnn DD statements for specifying input/output files. The FT05F001 DD statement in (o) includes a UXP shell script created by the user, and a corresponding input file is created in the UFS file system. The FT06F001 DD statement in (p) specifies an output file including the execution results, and a corresponding output file is created in the UFS file system. Furthermore, the FT10F001 DD statement in (q) includes a C language program for outputting the temperature correspondence table created by the user, and a corresponding input file is created in the VFL file system.

FIG. 15 shows an executable shell script created by the control program shown in FIG. 14. In this figure, "fu10" in the first line is an environment variable indicating an input file. "sh" in the fourth line is an execution command of the shell script, and the input/output files are specified in the same line. The UXP initiator 14 creates the executable shell script and requests the UXP to execute it if the program name examined in Step S31 in FIG. 9 indicates an execution process of the shell script. The created executable shell script is transferred to the UXP and executed.

Figure 16:
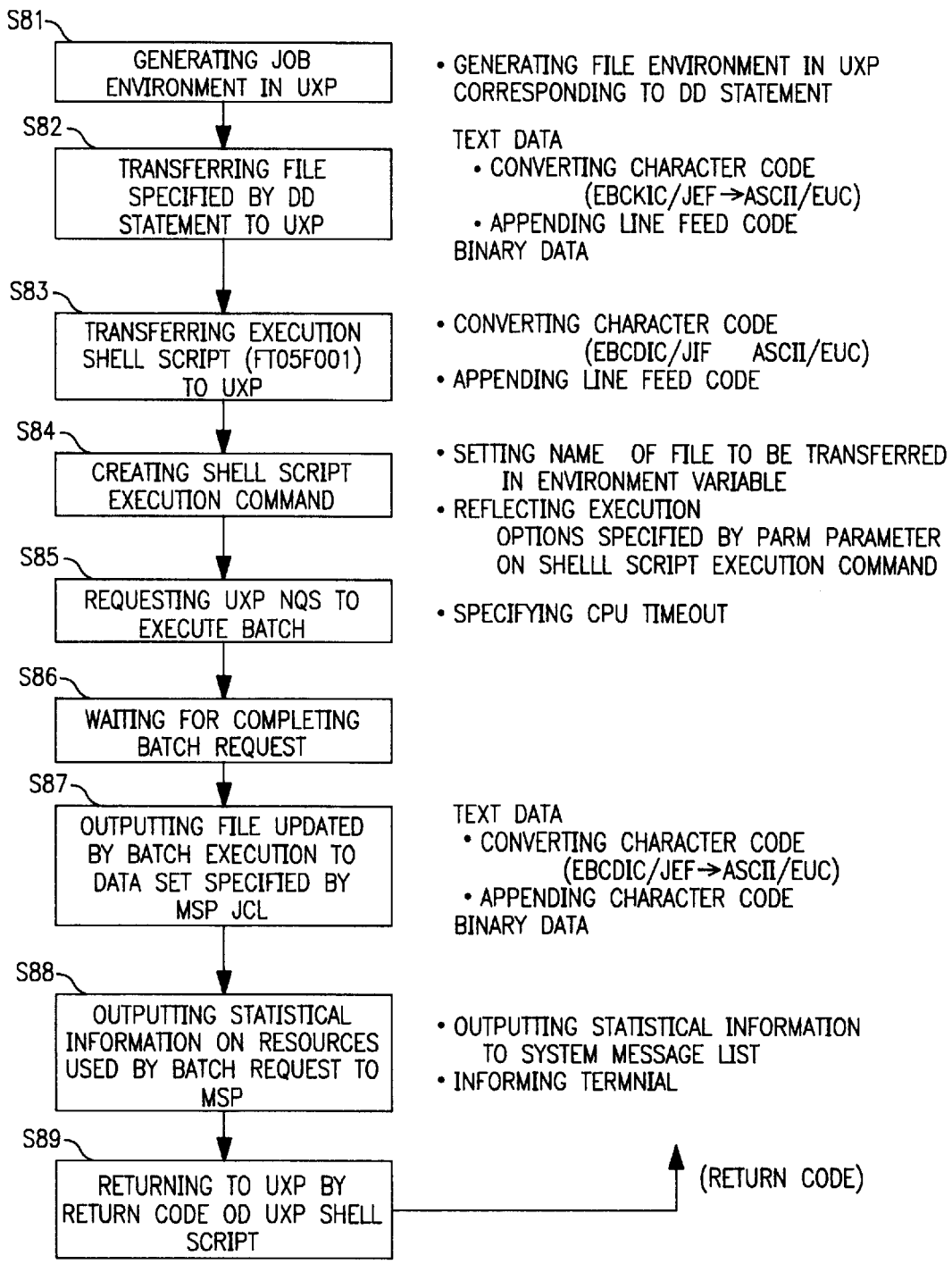
FIG. 16 shows an operating flowchart for executing the shell script by the UXP initiator.

FIG. 16 is a operating flowchart showing the execution process of a UNIX shell script performed by the UXP initiator 14. In this figure, the UXP initiator 14 creates a job environment in the UXP in Step S81. The file environment corresponding to each DD statement included in the control program is created in the UXP.

Then, the UXP initiator 14 transfers a file specified by each DD statement to the UXP in Step S82. At that time, the UXP initiator 14 performs character code conversion, for example, as shown in FIG. 3, to convert the EBCDIC/JEF code into the ASCII/EUC code. The UXP initiator 14 also performs data format conversion to append line feed codes to the record. For binary data, data format conversion such as the one shown in FIG. 4C is performed.

The UXP initiator 14 then transfers the shell script (FT05F001) to the UXP in Step S83. At that time, the UXP initiator 14 performs a transfer, after performing the character code and data format conversion similar to the one performed in Step S82.

Next, the UXP initiator 14 creates execution commands of the shell script (executable shell script) in Step S84. It sets a transferred file name in an environment variable and reflects execution options specified by the parameter PARM on the execution commands of the shell script. It also specifies a UXP command interpreter. By performing such a process, the control program shown in FIG. 14, for example, creates the executable shell script shown in FIG. 15.

After that, the UXP initiator 14 transfers the executable shell script to the NQS 24 in the UXP, requests batch execution with a CPU timeout specified in Step S85, and waits for completion of the batch request in Step S86. The NQS 24 tells an execution part 23 to execute the transferred executable shell script. At that time, the command interpreter specified in the executable shell script is invoked. The program included in the input file is executed by sequentially interpreting the program in the input file.

When receiving a completion code and the execution results of the batch request from the initiator 22 in UXP, the UXP initiator 14 outputs a file updated by the batch execution to an MSP data set specified by the control program in the MSP in Step S87. For the text data at that time, the UXP initiator 14 inversely converts the character code to append line feed codes. While for the binary data, it inversely converts a record format such as the one shown in FIG. 4C.

Then, the UXP initiator 14 outputs statistical information on the resources used by the batch request to the MSP in Step S88. This information is output to a system message list and informed to each user terminal.

After that, the system returns to the UXP by a return code of the UXP shell script in Step S89.

According to the embodiments shown in FIGS. 14, 15, and 16, a control program described in the language used by the MSP can include part of a program described in the language used by the UXP to execute the control program. If a back-end processor 21 running under the UXP is unavailable for a user, who wants to make a request for process execution from a front-end processor 11 to the back-end processor 21 via a LAN 35, this method is available.

INDUSTRIAL APPLICABILITY

According to the present invention, when a user enters a job to a front-end processor, program conversion and data conversion are automatically performed as needed, so that a back-end processor running under a different operating system can perform a process. Accordingly, the user can take advantage of the back-end processor without being conscious of the differences between operating systems or between programming languages. In the meantime, the user may enter the job in the front-end processor using a program where different languages are used together, in order to intentionally make the back-end processor execute the process. The present invention is suitable for an information processing system where two or more different operating systems are running when a job control program executed by one operating system is entered via another operating system.

What is claimed is:

1. An inter-OS job execution system, in which a first processor running under a first operating system requests a second processor running under a second operating system different from the first operating system to execute a job including one or more job steps, said inter-OS job execution system comprising:

job entry means for entering first information to the first processor to execute a program in the first operating system, the first information being in a language recognizable by the first operating system;

language conversion/transfer means for converting the entered first information into second information to execute the program in the second operating system in the second processor, the second information being in a language recognizable by the second operating system and different from the language recognizable by the first operating system, the second information including information of a file environment specified by the first information, for transferring the second information to the second processor, and for generating the file environment in the second processor;

data conversion/transfer means for mutually performing a conversion and a transfer between a file used by the first processor and a file used by the second processor, the file used by the second processor being in the file environment; and job execution means for executing a program specified by the second information, which is transferred by said language conversion/transfer means, using data transferred by said data conversion/transfer means from the first processor to the second processor.

2. The inter-OS job execution system according to claim 1, wherein the first processor includes a job invocation means for instructing said job execution means embedded in the second processor to execute the program specified by the second information, and said job execution means executes the program specified by the second information according to an instruction given by said job invocation means.

3. The inter-OS job execution system according to claim 1, further comprising an output means for outputting a process result, wherein said job execution means outputs an execution result of the program specified by the second information;

wherein said data conversion/transfer means converts contents of the execution result and transfers the contents to the first processor; and wherein said output means outputs the contents as the process result.

4. The inter-OS job execution system according to claim 1, wherein said job entry means enters a control program for controlling a job to the first processor as the first information;

wherein said language conversion/transfer means converts the control program into a program for the second processor and transfers the second information including the program for the second processor to the second processor; and wherein said job execution means executes the program for the second processor.

5. The inter-OS job execution system according to claim 4, wherein said job entry means enters the control program described in a job control language to the first processor;

wherein said language conversion/transfer means generates a job environment specified by the control program, the job environment including the information of the file environment, and transfers the second information including the job environment to the second processor;

wherein said data conversion/transfer means converts a file included in the job environment and transfers the file to the second processor; and wherein said job execution means references the file included in the file environment and executes the program for the second processor.

6. The inter-OS job execution system according to claim 1, wherein said job entry means enters the control program for controlling the job, which includes a program for the second processor, to the first processor as the first information;

wherein said language conversion/transfer means extracts the program for the second processor from the control program, and transfers the second information including the program for the second processor to the second processor; and wherein said job execution means executes the program for the second processor.

7. A first processor, for use in an inter-OS job execution system, running under a first operating system, and requesting a second processor running under a second operating system different from the first operating system to execute a job including one or more job steps, said first processor comprising:

job entry means for entering first information to execute a program in the first operating system, the first information being in a language recognizable by the first operating system;

language conversion/transfer means for converting the first information into second information to execute the program in the second processor, the second information being in a language, recognizable by the second operating system and different from the language recognizable by the first operating system, the second information including information of a file environment specified by the first information, for transferring the second information to the second processor, and for generating the file environment in the second processor; and data conversion/transfer means for converting data used to execute the program specified by the second information into data for the second processor, and transferring converted data to the file environment in the second processor.

8. The first processor according to claim 7, further comprising job invocation means for instructing the second processor to execute the program specified by the second information.

9. A second processor, for use in an inter-OS job execution system in which a first processor running under a first operating system requests said second processor running under a second operating system different from the first operating system to execute a job including one or more job steps, said second processor comprising:

reception means for receiving information to execute a program in the second operating system from the first processor, the information being in a language, recognizable by the second operating system and different from a language recognizable by the first operating system, the information including information of a file environment for the job, and for generating the file environment in the second processor; and job execution means for executing the program specified by the information using data transferred for the first processor, the data being in the file environment.

10. The second processor according to claim 9, wherein said job execution means executes the program according to an instruction given by the first processor.

11. An inter-OS job execution system, in which a first operating system requests a second operating system to execute a job including one or more job steps, said inter-OS job execution system comprising:

job entry means for entering first information to execute a program in the first operating system, the first information being in a language recognizable by the first operating system;

language conversion/transfer means for converting the first information into second information to execute the program in the second operating system, the second information being in a language, recognizable by the second operating system and different from the language recognizable by the first operating system, the second information including information of a file environment specified by the first information, for transferring the second information to the second operating system, and for generating the file environment under the second operating system;

data conversion/transfer means for mutually performing a conversion and a transfer between a file used by the first operating system and a file used by the second operating system, the file used by the second operating system being in the file environment; and job execution means for executing a program specified by the second information transferred by said language conversion/transfer means, using the data transferred by said data conversion/transfer means from the first operating system to the second operating system.

12. An inter-OS job execution method in which a first processor running under a first operating system requests a second processor running under a second operating system different from the first operating system to execute a job including one or more job steps, comprising the steps of:

entering first information to the first processor to execute a program in the first operating system, the first information being in a language recognizable by the first operating system;

converting the first information into second information to execute the program in the second operating system in the second processor, the second information being in a language, recognizable by the second operating system and different from the language recognizable by the first operating system, the information including information of a file environment specified by the first information and transferring the second information to the second processor;

generating the file environment in the second processor;

converting a file used by the first processor into a file used by the second processor, the file used by the second processor being in the file environment and transferring a converted file from the first processor to the second processor; and executing a program specified by the second information using data in a transferred file used by the second processor.

* * * * *

UNITED STATES PATENT AND TRADEMARK OFFICE
CERTIFICATE OF CORRECTION

PATENT NO. : 5,812,843

DATED : September 22, 1998

INVENTOR(S) : Yamazaki et al.

It is certified that error appears in the above-identified patent and that said Letters Patent is hereby corrected as shown below:

Title page, [63], Delete data and replace with --Continuation of Ser. No. 578,580, abandoned, filed as PCT/JO95/01049, May, 31, 1995.--, Col. 1, line 6, after "08/578,680, insert --now abandoned--; and
line 7, after "Dec. 7, 1995" delete ", now abandoned".

Col. 2, line 9, change "by," to --by--,
line 65, change "present-" to --present--.

Col. 3, line 28. after "provided" insert --with--;

Col. 5, line 23, change "code" to --codes--.

Col. 9, line 27, change "Command-options" to --Command options--.

Col. 11, line 51, change "deal location" to --deallocation--.

Signed and Sealed this

Eleventh Day of May, 1999

Q. TODD DICKINSON

*Attest:*

*Attesting Officer*            Acting Commissioner of Patents and Trademarks